US010846660B2

(12) United States Patent
Tullimalli et al.

(10) Patent No.: US 10,846,660 B2
(45) Date of Patent: Nov. 24, 2020

(54) PRIORITIZATION AND GUIDANCE OF AN AUTONOMOUS VEHICLE TO A DETERMINED SERVICE PROVIDER

(71) Applicant: Intel Corporation, Santa Clara, CA (US)

(72) Inventors: Madhuri Tullimalli, Folsom, CA (US); Prashant Lalwani, Folsom, CA (US); Katalin Bartfai-Walcott, El Dorado Hills, CA (US); Felipe Antonio De La Pena Contreras, El Dorado Hills, CA (US); Ghouse-Adoni Mohammed, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 15/718,781

(22) Filed: Sep. 28, 2017

(65) Prior Publication Data

US 2019/0095872 A1 Mar. 28, 2019

(51) Int. Cl.
*G05D 1/00* (2006.01)
*G06Q 10/10* (2012.01)
*G06Q 30/06* (2012.01)
*B60S 5/06* (2019.01)
*G05D 1/02* (2020.01)
(Continued)

(52) U.S. Cl.
CPC ........ *G06Q 10/1097* (2013.01); *B60L 53/665* (2019.02); *B60L 53/80* (2019.02); *B60S 5/06* (2013.01); *G05D 1/0225* (2013.01); *G06Q 30/0633* (2013.01); *B60S 5/02* (2013.01)

(58) Field of Classification Search
CPC .................. G06Q 10/1097; B60L 11/1822
See application file for complete search history.

(56) References Cited

U.S. PATENT DOCUMENTS

2009/0106036 A1\* 4/2009 Tamura .................. G06Q 10/20
705/305
2015/0199619 A1\* 7/2015 Ichinose ............ G01C 21/3469
705/5
(Continued)

OTHER PUBLICATIONS

US 10,289,984 B1, 05/2019, Zanghi (withdrawn)\*

*Primary Examiner* — Jess Whittington
(74) *Attorney, Agent, or Firm* — Schwabe, Williamson & Wyatt, P.C.

(57) ABSTRACT

Embodiments include apparatuses, systems, and methods for a computer-aided or autonomous driving (CA/AD) system to transmit to a remote service scheduling server, a request message for a service slot at a service provider. In embodiments, the remote service scheduling server may assign the service slot for a semi-autonomous or autonomous driving (SA/AD) vehicle including the CA/AD system. In embodiments, the service scheduling server may perform analysis or machine learning on data received from the CA/AD system as well as from a plurality of service stations in order to assign the service provider and/or service slot to the SA/AD vehicle. In embodiments, the CA/AD system may receive an assignment message and control driving elements of the SA/AD vehicle to autonomously or semi-autonomously drive the SA/AD vehicle to the service provider to receive the service at the assigned service slot. Other embodiments may also be described and claimed.

18 Claims, 8 Drawing Sheets

(51) Int. Cl.
*B60L 53/80* (2019.01)
*B60L 53/66* (2019.01)
*B60S 5/02* (2006.01)

(56) References Cited

U.S. PATENT DOCUMENTS

| | | | |
|---|---|---|---|
| 2015/0348335 A1* | 12/2015 | Ramanujam | G05D 1/0088 701/23 |
| 2016/0098525 A1* | 4/2016 | Maheshwari | G16H 40/20 705/2 |
| 2016/0125366 A1* | 5/2016 | McCaffrey | G06Q 10/1095 705/7.19 |
| 2017/0024704 A1* | 1/2017 | Tompkins | G06Q 10/1095 |
| 2017/0278312 A1* | 9/2017 | Minster | G06Q 10/00 |
| 2019/0050783 A1* | 2/2019 | Gutierrez Sanchez | G06Q 10/1091 |

\* cited by examiner

| | 504 | | | | | 506 | | | | 502 | 512 |
|---|---|---|---|---|---|---|---|---|---|---|---|
| Fuel Price (x1) | Preferred Provider (x2) | Fuel Type (x3) | Distance (x4) | Membership (x5) | Open Slots (x6) | Service Time (x7) | Current Queue (x9) | ... | Other Factors (xn) | Preemption Factor y | Real Service Factor z |
| $4.0 | Yes | All | 3.1 mi | Yes | 0 | 5 min | 20 | | | 0.2 | 0.25 |
| $3.9 | No | Gas | 2 mi | No | 1 | 10 min | 5 | | | 0.5 | 0.42 |
| $4.1 | Yes | Electric | 2.5 mi | No | 5 | 120 min | 0 | | | 0.75 | 0.59 |
| ... | ... | ... | ... | ... | ... | ... | ... | | | ... | ... |

PRIORITIZATION AND GUIDANCE OF AN AUTONOMOUS VEHICLE TO A DETERMINED SERVICE PROVIDER

FIELD

Embodiments of the present invention relate generally to the technical fields of autonomous or semi-autonomous driving, and more particularly to guidance and control of autonomous or semi-autonomous vehicles to service providers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Driving automation is currently classified based on six different levels. The classifications range from Society of Automotive Engineers (SAE) Level 0 (no automation) to SAE Level 5 (full automation). Once autonomous cars approach self-driving or almost self-driving at the higher SAE Levels, their daily usage will increase significantly. Experts predict that approximately 10 million autonomous or semi-autonomous vehicles may be on the roads within the next few years, resulting in increased traffic as well as longer lines at fueling, charging, and other service stations.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
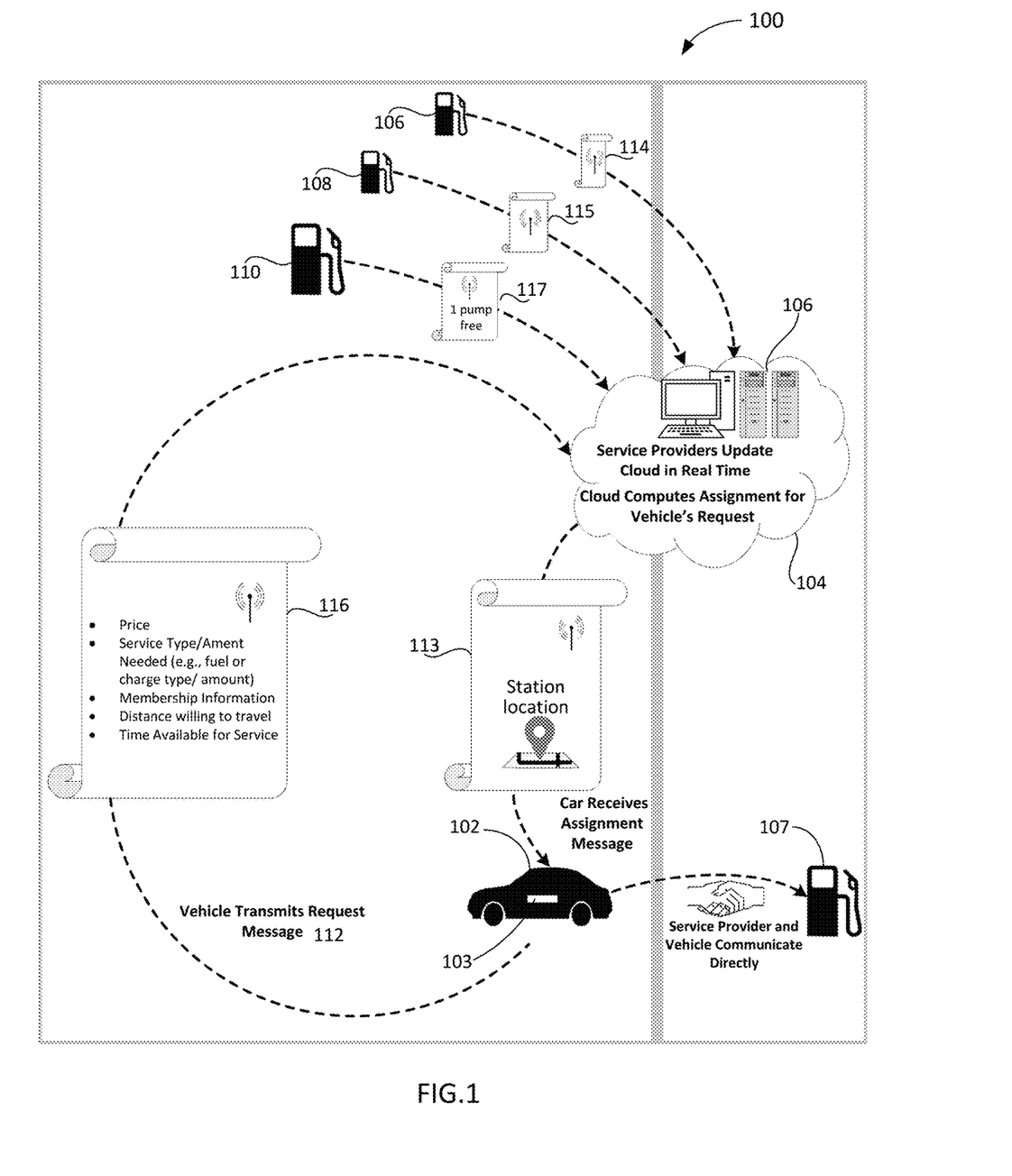
FIG. 1 illustrates an example environment 100 including a computer-aided or autonomous (CA/AD) system in which various embodiments may be practiced.

Embodiments described herein include a computer-aided or autonomous driving (CA/AD) system to transmit a request to a service scheduling server remote to the CA/AD system. In embodiments, the request may be for a service slot (such as a time slot, a physical slot, or both) at a service provider to be assigned for a semi-autonomous or autonomous driving (SA/AD) vehicle including the CA/AD system to receive a service. In response, in the embodiment, the CA/AD system may receive from the scheduling server, an assignment message assigning the service slot to the SA/AD vehicle. In embodiments, the CA/AD system may allow the service provider and the SA/AD vehicle to communicate directly regarding a status of the service slot. The CA/AD system, in embodiments, may control driving elements of the SA/AD vehicle to autonomously or semi-autonomously drive the SA/AD vehicle to the service provider to receive the service at the assigned service slot. Non-limiting examples of service may include re-fueling, oil change, brake check or replacement, engine tune up, and so forth FIG. 1 illustrates an example environment 100 in which various embodiments may be practiced. In embodiments, environment 100 may include a semi-autonomous or autonomous driving (SA/AD) vehicle 102, a plurality of service providers 106, 108, and 110, cloud computing services/systems 104 ("cloud 104"), and remote service scheduling server 106 ("scheduling server 106"). In embodiments, SA/AD vehicle 102 may include a computer-aided or autonomous driving (CA/AD) system 103, discussed further below with respect to FIG. 2, that may transmit to scheduling server 106, a request message 112 for a service slot at one of service providers 106, 108 or 110. In embodiments, CA/AD system 103 may further transmit to scheduling server 106, user parameters 116 related to, e.g., price, requested service-type, membership information, distance willing to travel, time available for service, priority fees, and the like. In embodiments, user parameters 116 may be pre-set or updated/entered by a user/driver after request message 112 has been transmitted.

In embodiments, scheduling server 106 may also acquire data 114, 115, and 117 related to availability of the service from plurality of respective service providers 106, 108, and 110. In embodiments, data 114, 115 and 117 may include at least one of fuel or charge price, type of fuel or charge provided, open slots, location, and a current queue length at each of respective service providers 106, 108, and 110. Accordingly, in the embodiment, scheduling server 106 may transmit to CA/AD system 103, in response to request message 112, an assignment message 113 assigning a service slot to SA/AD vehicle 102. In embodiments, assignment message 113 may include an identity and location of a selected or determined service provider 107 determined by scheduling server 106 based on analysis of data 114, 115, 117 in conjunction with user parameters 116. Accordingly, scheduling server 106 may analyze respective data 114, 115, and 117 in conjunction with information associated with request message 112 to determine selected service provider 107. As will be discussed further with respect to FIG. 5, scheduling server 106 may perform machine learning on data 114, 115, and 117 in conjunction with request messages and user preferences associated with a plurality of additional SA/AD vehicles (not shown) requesting a service slot from scheduling server 106.

Figure 2:
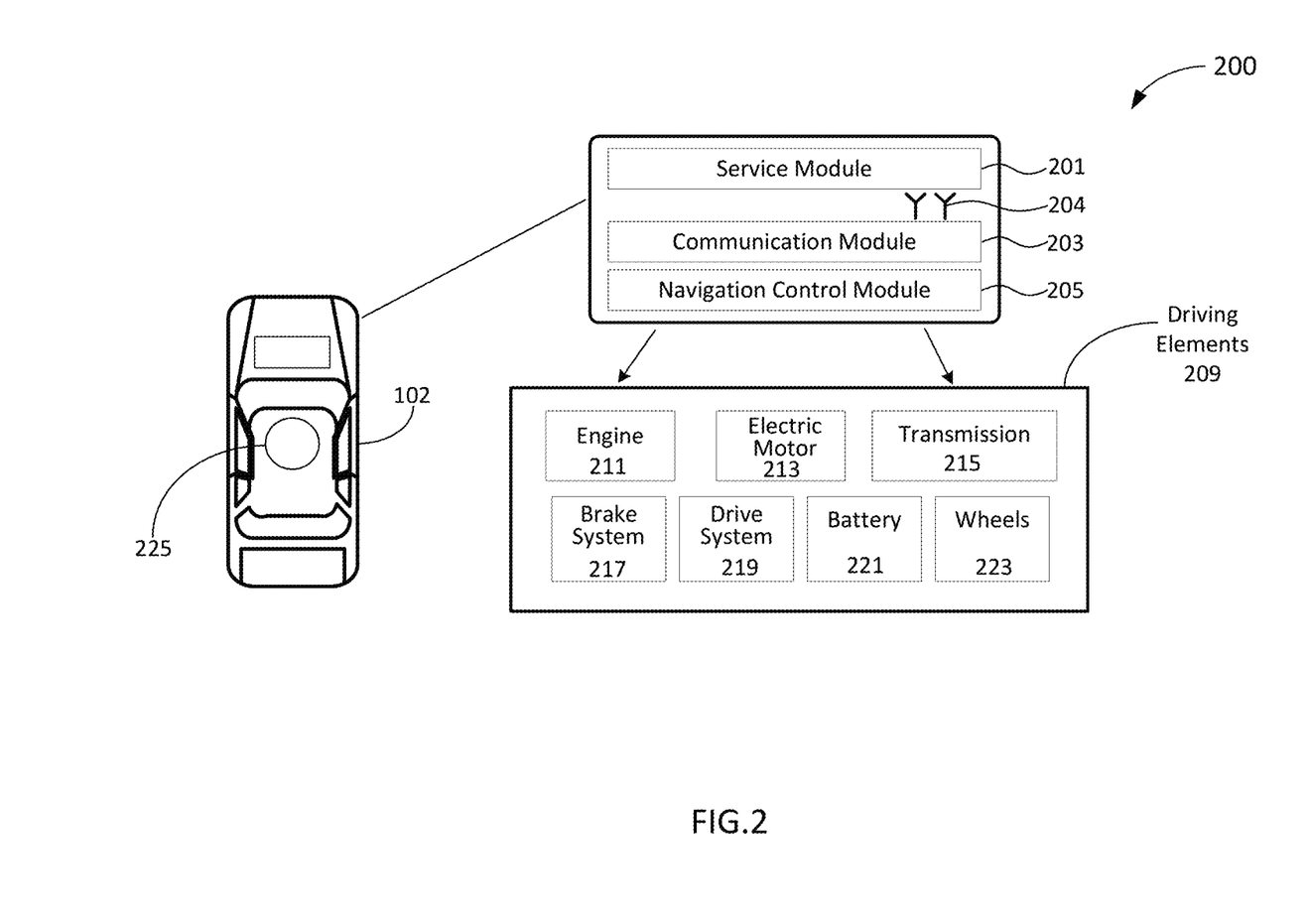
FIG. 2 is a block diagram 200 illustrating the CA/AD system included in FIG. 1 in accordance with various embodiments.

FIG. 2 is a block diagram 200 illustrating the CA/AD system 103 of FIG. 1 in accordance with various embodiments. As illustrated, in embodiments, CA/AD system 103 of SA/AD vehicle 102 may include a service module 201, communications module 203, and a navigation control module 205. In embodiments, CA/AD system 103 may be coupled to, and control, driving elements 209. Driving elements 209 may comprise, in embodiments, engine 211, electric motor 213, transmission 215, braking system 217, drive system 219, battery 221, and wheels 223. In embodiments, service module 201 may determine when SA/AD vehicle 102 may be in need of the service, and indicate to communications module 203 to send the request message, e.g. request message 112. In embodiments, service module 201 may include sensors coupled to one or more of driving elements 209 (or other driving elements, e.g. fuel tank, steering module, etc.) to receive sensor data indicative of a service need for SA/AD vehicle 102. Note that in embodiments, service module 201 may determine a need for various types of services, such as a need for fuel or charge, an oil change, battery change, tune up, or other maintenance or repair service for SA/AD vehicle 102.

In embodiments, communications module 203 may then transmit the request message for a service slot at a service provider (e.g., 106, 108, and 110 of FIG. 1) to a scheduling server (e.g., scheduling server 106 of FIG. 1) remote to the CA/AD system 103. In embodiments, communications module 203 may be coupled to service module 201 and include a transceiver 204 to transmit the request message to scheduling server 106 and also to receive the assignment message. In embodiments, once the assignment message is received, CA/AD system 103 may control driving elements 209 to autonomously or semi-autonomously drive SA/AD vehicle 102 to the determined service provider to receive the service at the assigned service slot. In embodiments, navigation control module 205 may receive a location of the determined service provider and control a steering module to drive SA/AD vehicle 102 to the location. Note that in embodiments, at least one of a vision-based camera, radar, and light detection and ranging (LIDAR) sensor, such as each may be located at e.g., 225 on SA/AD vehicle 201, may be coupled to navigation control module 205 to assist in guiding SA/AD vehicle 102 to the location and/or into a physical slot associated with the assigned service slot.

Figure 3:
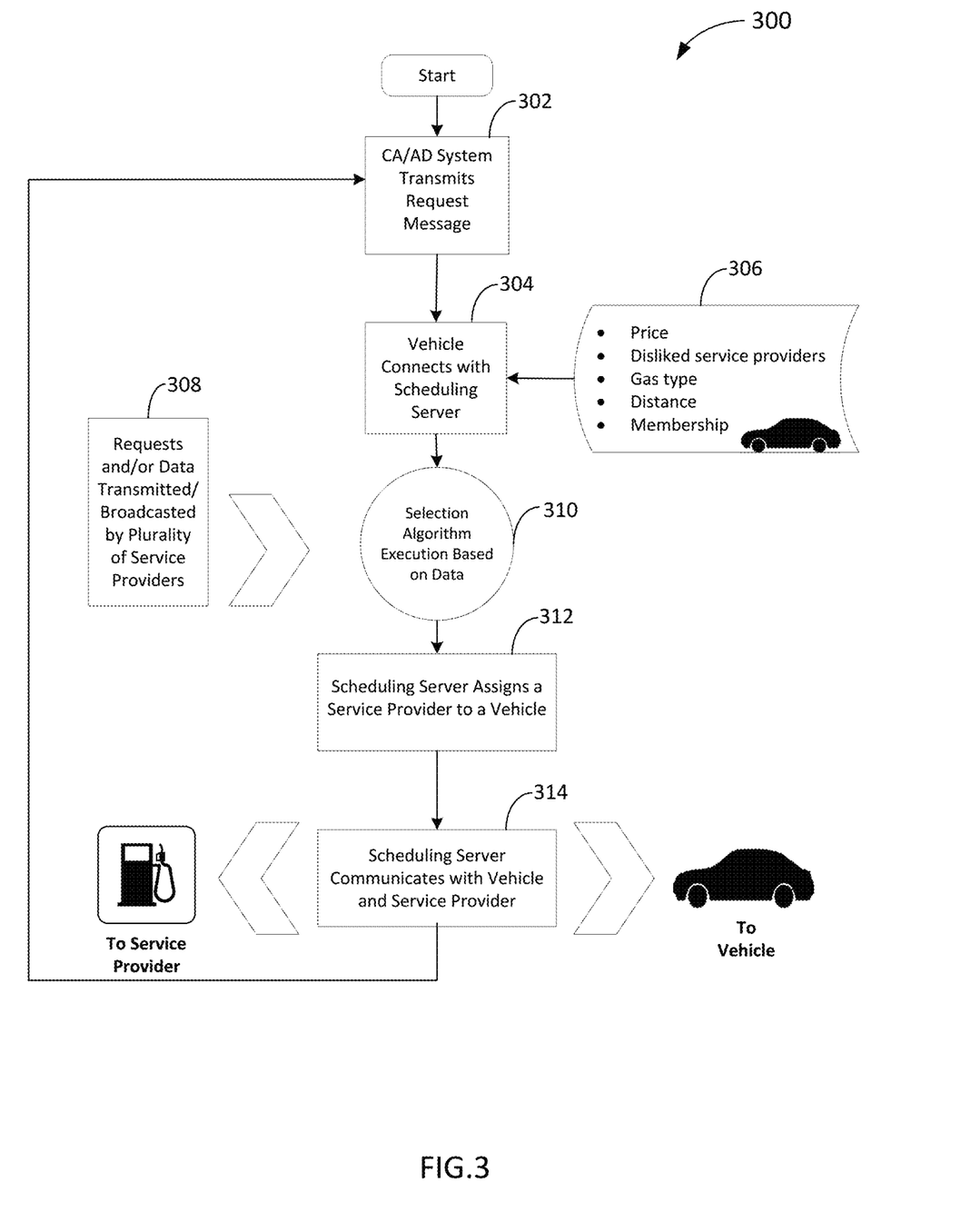
FIG. 3 is an example flow diagram 300 of a method associated with FIGS. 1 and 2 in accordance with various embodiments

FIG. 3 is an example flow diagram 300 of a method associated with FIGS. 1 and 2 in accordance with various embodiments. For the embodiment, at a block 302, a CA/AD system, e.g. CA/AD system 103, may transmit a request message to a remote scheduling server, e.g. scheduling server 106, to request a service slot at a service provider to be assigned for a vehicle, e.g., SA/AD vehicle 102, to receive a service. At a next block 304, in the embodiment, the vehicle may connect with the scheduling server, e.g., via cloud 104 of FIG. 1. In the embodiment, the scheduling server may retrieve from the vehicle or from its own storage, user parameters, similar to user parameters 116. In embodiments, user parameters may include, for example as shown in block 306, price, preferred/less preferred service provides, gas type, distance, and membership information. In the embodiment, at a side block 308, a plurality of service providers may transmit/broadcast request messages and/or data to be received by the scheduling server. At a next block 310, in the embodiment, the scheduling server may execute a selection algorithm (to be discussed further below in connection with FIG. 5) based on request messages and/or data received from the plurality of service providers as well as the request message and user parameters from the CA/AD system (and plurality of request messages and user parameters from additional requesting CA/AD systems). At a next block 312, in the embodiment, the scheduling server may assign a determined service provider to the vehicle. Finally, at a block 314, the scheduling server may communicate assignment information to the determined service provider and the vehicle.

Figure 4:
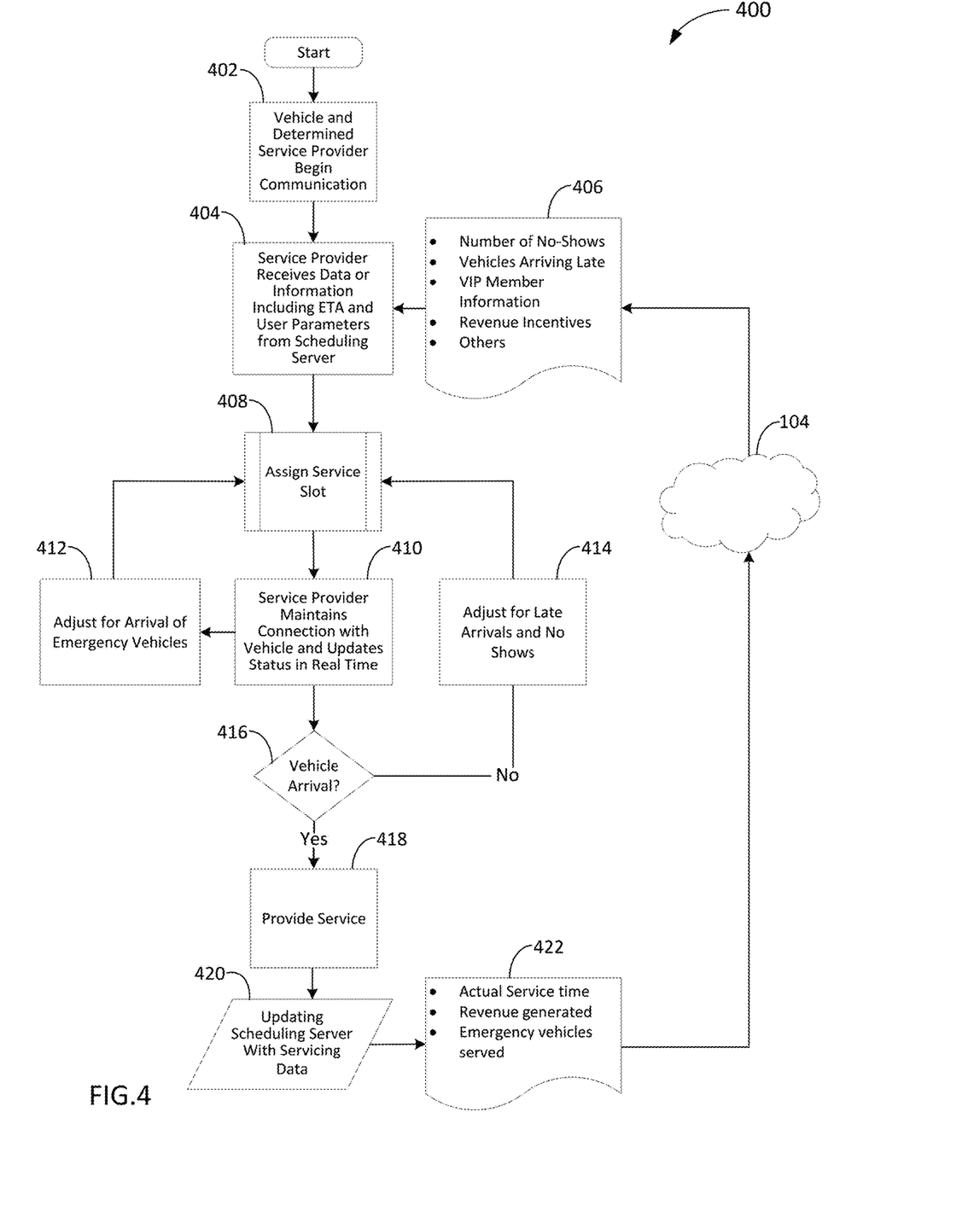
FIG. 4 is an example flow diagram 400 of a method associated with FIGS. 1-3 in accordance with various embodiments.

FIG. 4 is an example flow diagram 400 of a method associated with FIGS. 1-3 in accordance with various embodiments. In embodiments, flow diagram 400 may illustrate elements that may occur after the scheduling server has communicated assignment information to the service provider (e.g., at a last block 314 in flow diagram 300). In embodiments, the vehicle and the determined service provider ("service provider") may begin to communicate directly at a block 402. In the embodiment, the service provider, at a block 404, may receive directly from the vehicle, updated ETA and/or other information, such as for example, an urgency of service need (level of gas or charge remaining), and a location and/or destination of the vehicle. The service provider, in embodiments, may also receive additional information from the scheduling server, such as shown in side block 406, including data that may affect which service slot may be reserved or assigned to the vehicle. In embodiments, such information may include information related to, e.g., late vehicle arrivals, VIP Membership Information (e.g., if the vehicle or other requesting vehicles have paid additional fees for expedited services or faster assignment of service slots), revenue incentives, and the like.

Accordingly, the service provider, in embodiments, at a block 408, may then reserve or assign a service slot at the service provider location (which may be a physical slot, time slot, or both) to the vehicle. Next, in the embodiment, the service provider may maintain connection with the vehicle and update a status of the assigned service slot at a block 410. For example, at a left block 412, in the embodiment, the service provider may adjust a predicted service time and thus, an available service slot based upon an arrival of an emergency vehicle. In embodiments, if necessary, the method may return to re-assign a service slot at block 408. In embodiments, the service provider may then again maintain connection with the vehicle and update a status of the assigned service slot at a block 410. After a next decision block 416, if the vehicle arrives at the service provider, the service provider may provide the service at a block 418. If the vehicle arrives late or does not arrive, in embodiments, the method may flow upwards from decision block 416 to a side block 414, where the service provider may adjust for late arrivals and no-shows. Accordingly, in embodiments, the method may flow again through blocks 408 and 410, resetting or re-assigning the service slot if necessary at block 408. In the embodiment, once the vehicle has received the service at block 418, the service provider and/or the SA/AD vehicle may update the scheduling server in cloud 104 with feedback information about performance of the service at block 420. For example, as shown at a block 422, such information may be related to, e.g., actual service time, revenue generated, emergency vehicles served, and other factors that may influence a service time. Accordingly, data at the scheduling server may be updated to allow the service provider to more efficiently assign a service slot to another vehicle that communicates with the service provider at beginning block 402.

Figure 5:
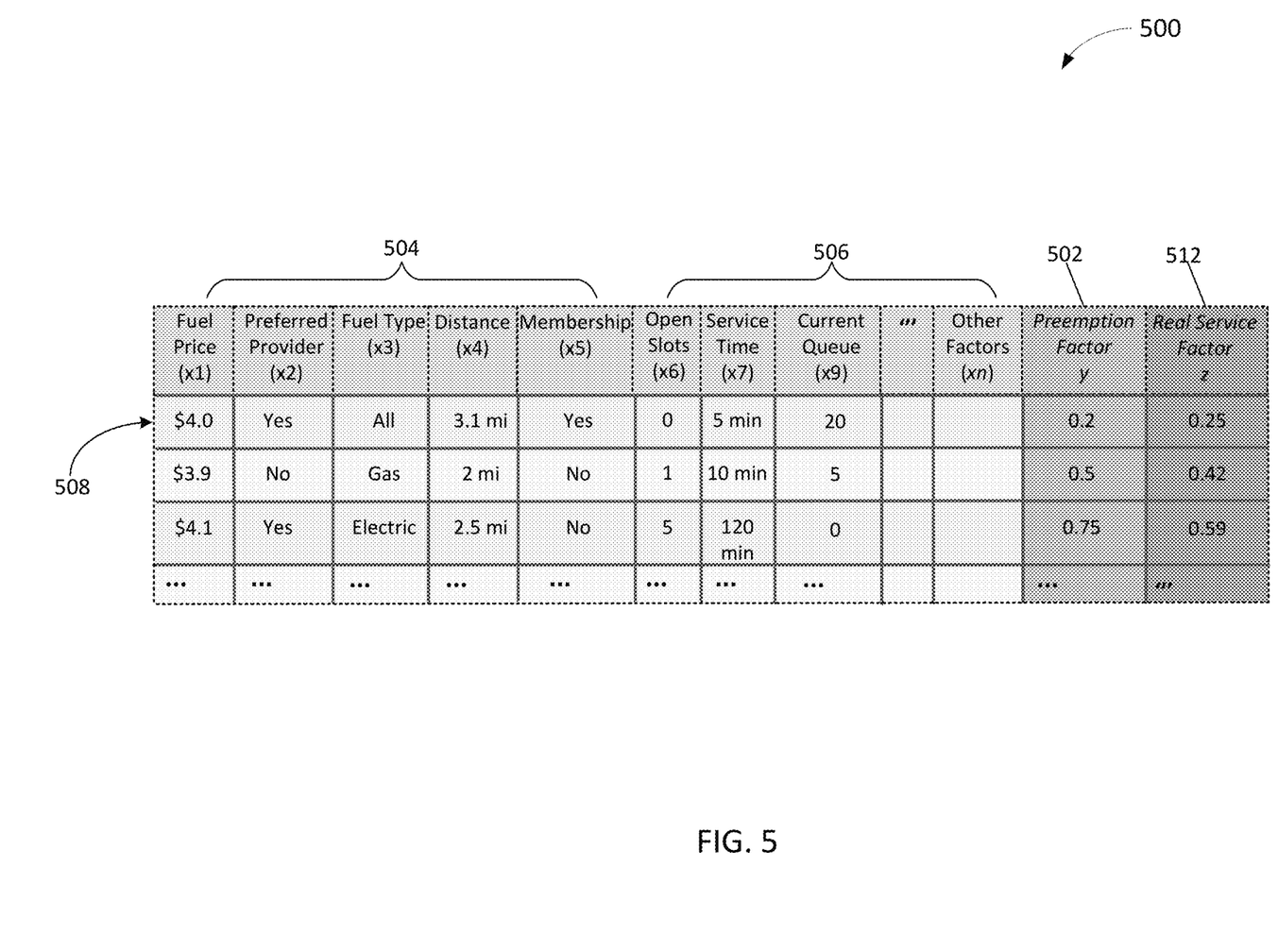
FIG. 5 is an example table 500 illustrating determination of an assignment of a service provider to a semi-autonomous or autonomous driving (SA/AD) vehicle.

FIG. 5 is an example table 500 illustrating determination of an assignment of a service provider to an SA/AD vehicle, in embodiments. In embodiments, a scheduling server, e.g., scheduling server 106, may use machine learning to calculate an estimated service time or preemption factor 502 that may assist in determination of the assignment. In embodiments, table 500 may correspond to one of a plurality of service providers, e.g. service providers 106, 108, or 110, that may be assigned to a requesting SA/AD vehicle, e.g., SA/AD vehicle 102. As an example, in the embodiment, columns 504 of table 500 may include factors such as may be included in user parameters 116 (e.g., Fuel Price (x1)-Membership (x5)) while columns 505 may include factors related to a status of services at the service provider (e.g., Open Slots (x6)-Current Queue (x9)). Accordingly, in embodiments, each row across table 500 may represent a requesting SA/AD vehicle. Thus, entries below each of factors 504 may represent how or whether the service provider meets a corresponding user parameter; entries below factors 505 may include data corresponding to a status of services at the service provider, for the embodiments. Accordingly, in embodiments, a prioritization module of the scheduling server may calculate a preemption factor, y, at column 502, taking into account a plurality of service providers and associated factors and a plurality of requesting SA/AD vehicles and associated factors y. In embodiments, the actual service time may be received in feedback data from the service provider or SA/AD vehicle after of performance of the service. Accordingly, in embodiments, column 512 may include a real service factor, z, an actual service time, for comparison to the preemption factor y. In embodiments, the scheduling server may use the feedback data to employ machine learning to determine a more accurate preemption factor for future assignments of service providers.

Additionally, although the Figures show only three service providers 106, 108, and 110, the three service providers 106, 108, and 110 may represent a plurality of service providers of varying numbers as well as of varying types of services offered. For example, although the primary examples illustrated relate to a service slot for gasoline/electric charge or vehicle maintenance, the service slot, in various embodiments, may be for any suitable service from any suitable service provider, e.g., drive-through services (groceries, restaurants, pharmacies, and the like) and/or supply-chain related services such as automated picking in warehouses by robotic vehicles.

Figure 6:
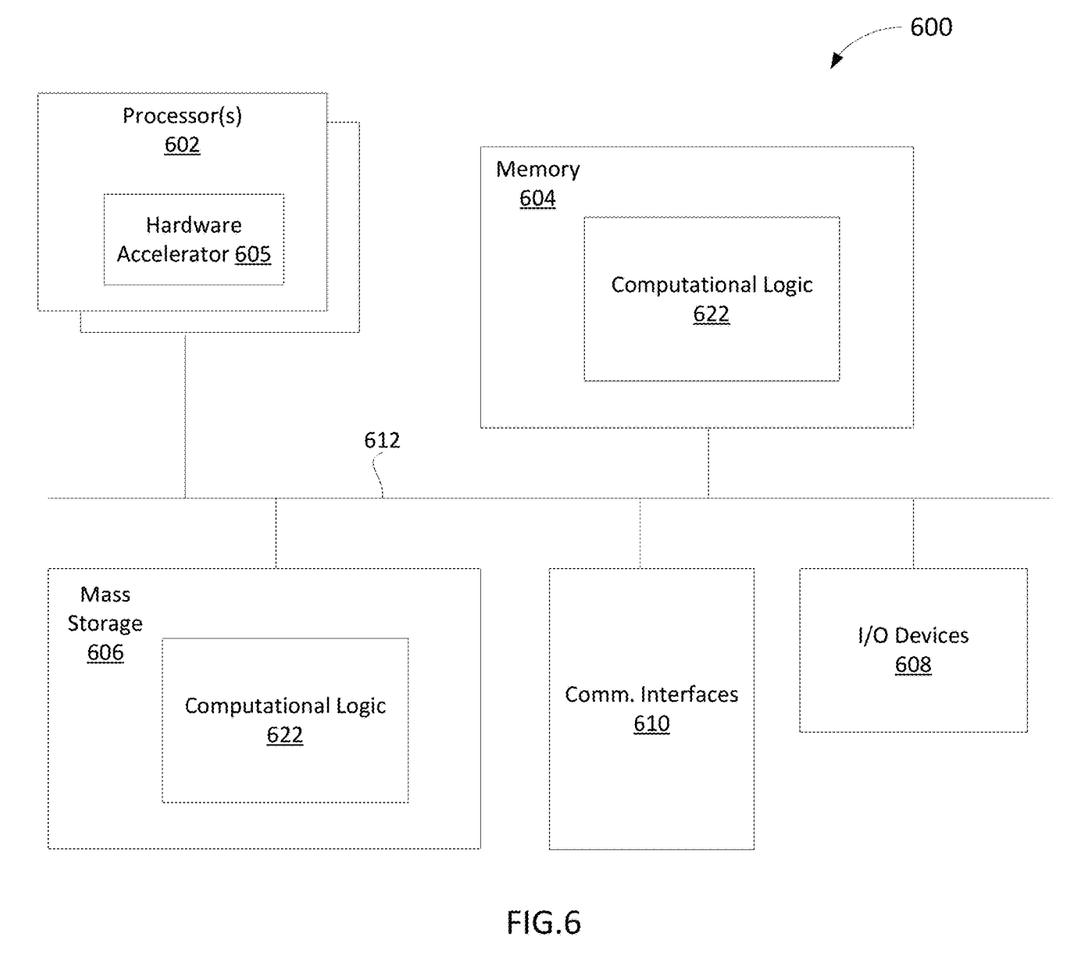
FIG. 6 illustrates an example system 600 in accordance with various embodiments.

FIG. 6 illustrates an example computing device 600 that may be suitable for use to practice selected aspects of the present disclosure. In embodiments, computing device 600 may be a CA/AD system of an SA/AD vehicle, e.g. CA/AD system 103, a remote scheduling server, e.g., a scheduling server 106 located in cloud 104 or similar scheduling server located at a service provider, e.g. one or more of service providers 106, 108, or 110. In the illustrated embodiment, system 600 may include one or more processors or processor cores 602, and a memory 604. In embodiments, one or more processors 602, in addition to cores, may include hardware accelerators 605, such as programmable circuits like Field Programmable Gate Arrays (FPGA). Additionally, computing device 600 may include mass storage devices 606 (such as diskette, hard drive, compact disc read only memory (CD-ROM) and so forth), communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

In embodiments, communication interfaces 610 may be included in e.g., a hardware or firmware implementation of communication module 203 of FIG. 2 (or aspects thereof), and include one or more communications chips and may enable wired and/or wireless communications for the transfer of data to and from the system 600. In some embodiments, communication interfaces 610 may include a transceiver including a transmitter and receiver or a communications chip including the transceiver. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 610 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 610 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others.

Each of these elements described above may perform its conventional functions known in the art. In particular, CA/AD system 103 may be employed to store and host execution of programming instructions implementing the operations associated with controlling driving elements of an SA/AD vehicle to autonomously or semi-autonomously drive the SA/AD vehicle to a service provider as described in connection with FIGS. 1-5. In other embodiments, a remote scheduling server may be employed to store and host execution of programming instructions implementing the operations associated with machine learning operations to determine an assigned service provider for one of a plurality of requesting SA/AD vehicles as described in connection with FIGS. 1-5. In embodiments, the aforementioned programming instructions may be collectively referred to as computational logic 622 that provides the capability of the embodiments described in the current disclosure. The various elements may be implemented by assembler instructions supported by processor(s) 602 or high-level languages, such as, for example, C, that can be compiled into such instructions. In embodiments, some of the operations earlier described to be operated on the one or more processors not implemented in software may be implemented in hardware, e.g., via hardware accelerator 605. Aspect of operations associated with controlling drive elements or determining a service provider assignment not implemented in software, as described in connection with FIGS. 1-5, may be implemented in the hardware accelerator.

The number, capability and/or capacity of these elements 602-622 may vary, depending on the number of other devices the computing device 600 is configured to support. Otherwise, the constitutions of elements 602-622 are known, and accordingly will not be further described.

As will be appreciated by one skilled in the art, the present disclosure may be embodied as methods or computer program products. Accordingly, the present disclosure, in addition to being embodied in hardware as earlier described, may take at least partial form of a software embodiment (including firmware, resident software, micro-code, etc.) or an embodiment combining software and hardware aspects that may all generally be referred to as a "circuit," "module," or "system."

Figure 7:
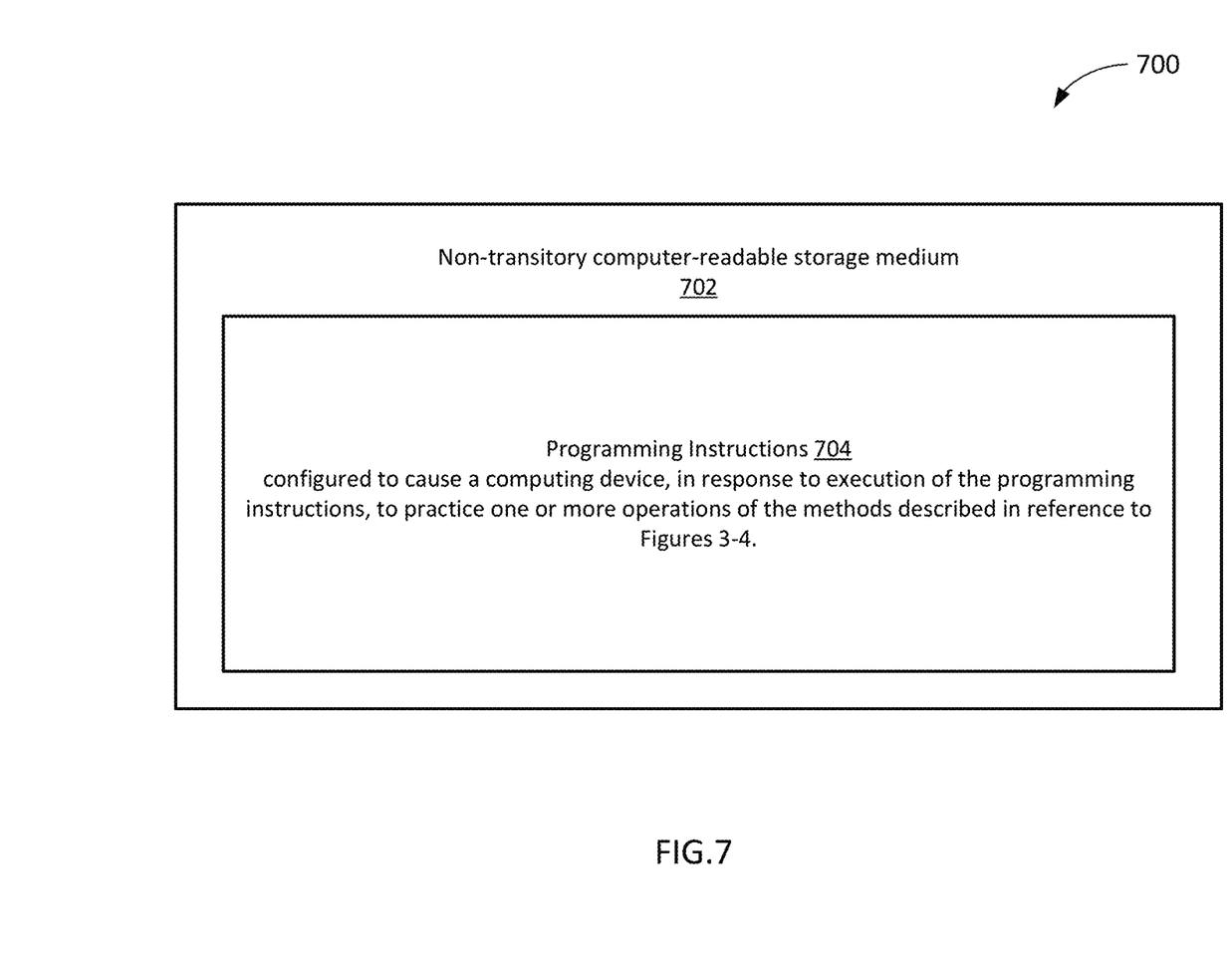
FIG. 7 illustrates a storage medium 700 having instructions for practicing methods described with references to FIGS. 1-6, in accordance with various embodiments.

Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 702 may include a number of programming instructions 704. Programming instructions 704 may be configured to enable a device, e.g., CA/AD system 103, in response to execution of the programming instructions to perform, e.g., various operations as discussed in FIGS. 1-5.

In alternate embodiments, programming instructions 704 may be disposed on multiple computer-readable non-transitory storage media 702 instead. In alternate embodiments, programming instructions 704 may be disposed on computer-readable transitory storage media 702, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
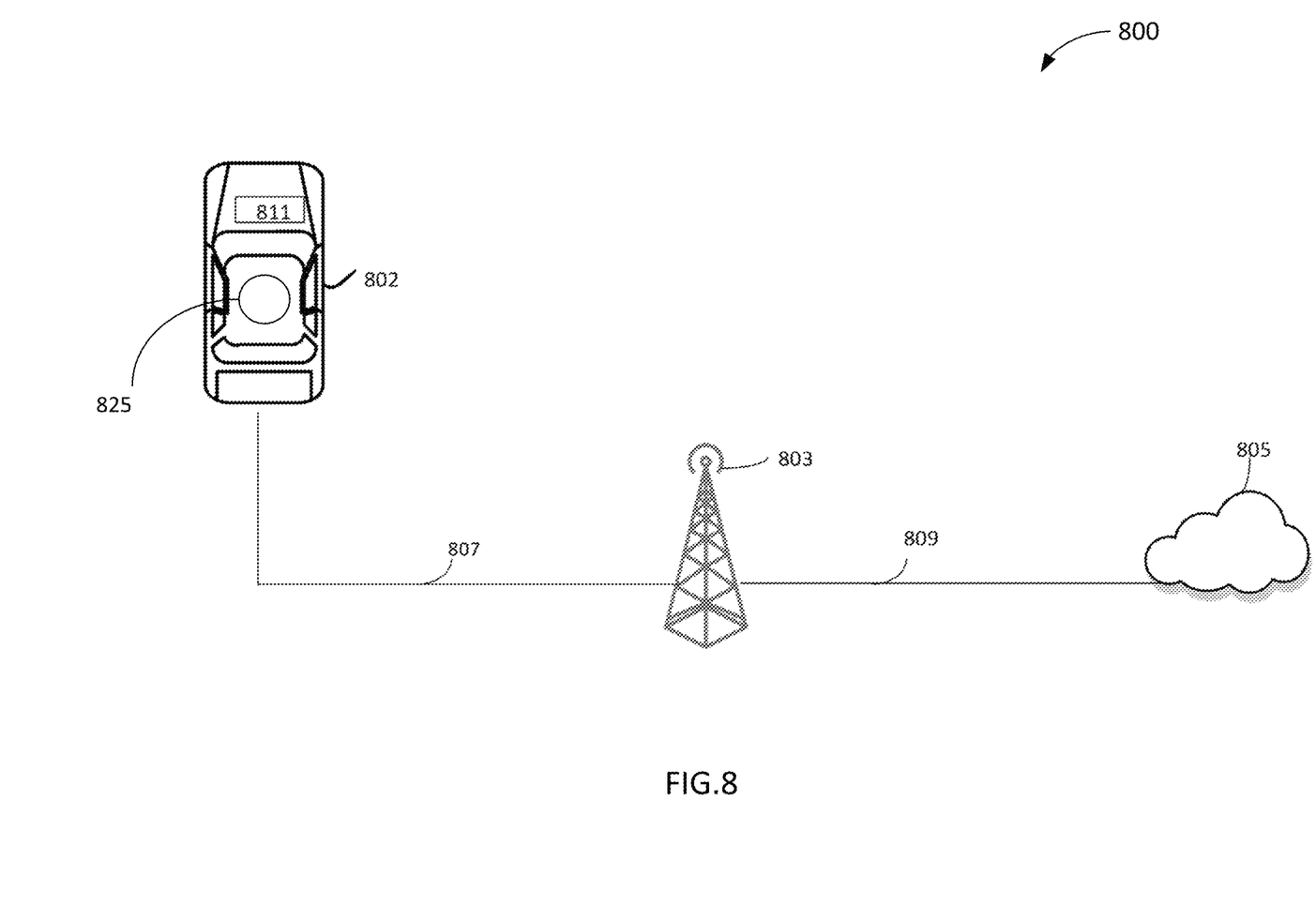
FIG. 8 illustrates an example environment 800 in which various embodiments may be practiced

FIG. 8 illustrates an environment 800 in which various embodiments described with references to FIGS. 1-7 may be practiced. Environment 800 includes vehicle 802, a wireless access node 803, and cloud computing services/systems 805, e.g., similar to cloud 104 of FIG. 1 ("cloud 805"). In embodiments, vehicle 802 may be an SA/AD vehicle including a CA/AD system to transmit a request message to a service scheduling server remote to the CA/AD system to request a service slot at a service provider to be assigned for the SA/AD vehicle to receive a service. In embodiments, the CA/AD system may receive, in response to the request message, an assignment message assigning the service slot to the SA/AD vehicle. In embodiments, the CA/AD system may comprise a vehicle control system to drive elements of the SA/AD vehicle to the service provider to receive the service at the assigned service slot.

For illustrative purposes, the following description has been provided illustrating vehicle 802 as a passenger car in a roadway environment. However, the embodiments described herein are also applicable to any type of vehicle, such as trucks, buses, motorcycles, boats or motorboats, and/or any other motorized devices that may benefit from a CA/AD system to receive an assignment of a service slot at a service provider as described in connection with FIGS. 1-7. For example, water vehicles such as boats, speedboats, ferries, barges, hovercrafts, other water vehicles etc., may also require services not only related to gas and electricity charge or maintenance but a similar variety of services that a passenger car may request. The embodiments described herein may also be applicable to flying objects, such as space rockets, aircraft, drones, unmanned aerial vehicles (UAVs), and/or to any other like motorized devices. As alluded to above, the embodiments may be applicable to robotic vehicles in supply-chain related services. For example, in an embodiment, service slots may correspond to open slots in a warehouse where products may be located until picked for fulfillment.

The vehicle 802 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 8 shows only a single vehicle 802, vehicle 802 may represent a plurality of individual motor vehicles of varying makes, models, trim, etc., which may be collectively referred to herein as the "vehicle 802."

In embodiments, vehicle 802, may include a CA/AD system that may include driving elements coupled to an onboard computer 811 and an output interface of the onboard computer, coupled to send signals to the driving elements to autonomously or semi-autonomously drive the vehicle to the service provider to receive the service at an assigned service slot. In embodiments, the onboard computer 811 may be any type of computer device that is mounted on, built into, or otherwise embedded in a vehicle and is capable of controlling complex command and control functions associated with a semi-autonomous or autonomous vehicle. As noted above, in embodiments, data obtained by the onboard computer 811 may include sensor data from one or more sensors embedded in the vehicle 802, data packets from other onboard computers 811s included in other vehicles 802 (not shown), data packets and/or data streams from cloud 805 and/or network infrastructure (e.g., core network elements of a cellular communications network, etc.), navigation signaling/data from on-board navigations systems (e.g., global navigation satellite system (GNSS), global positioning system (GPS), etc.), and/or the like.

For example, as noted in connection with FIG. 2, vehicle 802 may include, for example, a LIDAR sensor 825 (e.g., to locate itself and other objects, in an environment). In embodiments, signals from LIDAR sensor 825 as well as multiple video cameras (not shown) may comprise incoming sensor data to onboard computer 811. In embodiments, high performance sensitive devices, e.g., such as for example but not limited to, central processing units (CPUs), graphic processing units (GPUs), field-programmable gate arrays (FPGAs), may collaborate to analyze the incoming sensor data.

In embodiments, onboard computer 811 may also include, or operate in conjunction with communications circuitry and/or input/output (I/O) interface circuitry in order to obtain the data for the various sources. The communications circuitry of the vehicle 802 may communicate with the cloud 805 via wireless access node 803. The wireless access node 803 may be one or more hardware computer devices configured to provide wireless communication services to mobile devices (for example, onboard computer 811 in vehicle 802 or some other suitable device) within a coverage area or cell associated with the wireless access node 803. The wireless access node 803 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 807). Furthermore, one or more network interface controllers may be configured to transmit/receive with various network elements (e.g., one or more servers within a core network, etc.) over another backhaul connection (not shown). In embodiments, the onboard computer 811 may generate and transmit data to the wireless access node 803 over link 807, and the wireless access node 803 may provide the data to the cloud 805 over backhaul link 809. Additionally, during operation of the vehicle 802, the wireless access node 803 may obtain data intended for the onboard computer 811 from the cloud 805 over link 809, and may provide that data to the onboard computer 811 over link 807. The communications circuitry in the vehicle 802 may communicate with the wireless access node 803 in accordance with one or more wireless communications protocols as discussed herein.

As an example, the wireless access node 803 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 803 may be deployed outdoors to provide communications for the vehicle 802 when the vehicle 802 is operating at large, for example when deployed on public roads, streets, highways, etc.

In some embodiments, the wireless access node 803 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 803 is a GW, the wireless access node 803 may be deployed in an indoor setting, such as a garage, factory, laboratory or testing facility, and may be used to provide communications for while parked, prior to sale on the open market, or otherwise not operating at large.

In embodiments, the cloud 805 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 805 may be associated with network operator who owns or controls equipment and other elements necessary to provide network-related services, such as one or more base stations or access points (e.g., wireless access node 803), one or more servers for routing digital data or telephone calls (for example, a core network or backbone network), etc. Implementations, components, and protocols used to communicate via such services may be those known in the art and are omitted herein for the sake of brevity.

In some embodiments, the cloud 805 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 805 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 805 and database systems) may coordinate the delivery of data to the onboard computer 811 of vehicle 802. Implementations, components, and protocols used to communicate via such services may be those known in the art and are omitted herein for the sake of brevity.

Some non-limiting Examples are provided below.

Example 1 is a computer-aided or autonomous driving (CA/AD) system, comprising a service module to transmit to a service scheduling server remote to the CA/AD system to request a service slot at a service provider to be assigned for a semi-autonomous or autonomous driving (SA/AD) vehicle to receive a service, and receive, in response to the request, an assignment message assigning the service slot to the SA/AD vehicle; and a communications module coupled to the service module to transmit the request to the service scheduling server and to receive the assignment message, wherein the CA/AD system to control driving elements of the SA/AD vehicle to autonomously or semi-autonomously drive the SA/AD vehicle to the service provider to receive the service at the assigned service slot.

Example 2 is the CA/AD system of Example 1, wherein the service module to determine when the SA/AD vehicle is in need of the service, and to indicate to the communications module to send the request.

Example 3 is the CA/AD system of claim 2, wherein the request to be sent by the communications module to include at least one of a type of service, level of service need, and a location and destination of the SA/AD vehicle.

Example 4 is the CA/AD system of Example 1, wherein the communications module to receive the assignment message including an identity of a service provider selected based on at least one of fuel or charge price, type of fuel or charge provided, open slots, location, and a current queue length at each of the plurality of service providers.

Example 5 is the CA/AD system of Example 4, wherein the communications module to communicate directly with the service provider to receive updated service slot information while the SA/AD vehicle drives to a location of the service provider.

Example 6 is the CA/AD system of Example 1, wherein the communications module further to transmit to the service scheduling server, user preference data to include at least one of information related to price, type of fuel or charge associated with the service, membership information, distance willing to travel, priority fees, and time available for service.

Example 7 is the CA/AD system of Example 1, wherein the service module to collect information about performance of the service and provide the information to the communications module for transmission to the service scheduling server.

Example 8 is the CA/AD system of any one of Examples 1-7, wherein the CA/AD system comprises the SA/AD vehicle and further comprises the driving elements coupled to the service module and the communications module, wherein the driving elements include one or more of an engine, electric motor, braking system, drive system, wheels, transmission, and a battery Example 9 is the CA/AD system of any one of Examples 1-7, wherein the CA/AD system comprises the SA/AD vehicle and further comprises sensors coupled to the service module to receive sensor data indicative of a service need for the SA/AD vehicle.

Example 10 is the CA/AD system of any one of Examples 1-7, wherein the CA/AD system comprises the SA/AD vehicle and further comprises a navigation control module to receive a location of the service provider received in the assignment message and to control a steering module to drive the SA/AD vehicle to the location.

Example 11 is the CA/AD system of Example 10, further comprising at least one of a vision-based camera, radar, and light detection and ranging (LIDAR) sensor coupled to the navigation control module to assist in guiding the SA/AD vehicle into a physical slot associated with the assigned service slot. Example 12 is a method performed by a CA/AD system, comprising: transmitting by a transceiver, a request message to a service scheduling server remote to an SA/AD vehicle to request a service slot at a service provider to be assigned for a semi-autonomous or autonomous driving (SA/AD) vehicle to receive a service; receiving by the transceiver, in response to the request message, an assignment message assigning the service slot to the SA/AD vehicle; and controlling, by a vehicle control system, driving elements of the SA/AD vehicle to drive the SA/AD vehicle to the service provider to receive the service at the assigned service slot.

Example 13 is the method of Example 12, wherein transmitting the request message by the transceiver includes transmitting information related to at least one of a location of the SA/AD vehicle, a destination of the SA/AD vehicle, and a level of fuel or charge remaining in the SA/AD vehicle.

Example 14 is the method of Example 12, further comprising determining by a service module coupled to the driving elements, when the SA/AD vehicle is in need of the service.

Example 15 is the method of Example 12, wherein determining by the service module need of the service includes determining a need for at least one of an oil change, battery change, tune up, or other maintenance or repair service for the SA/AD vehicle.

Example 16 is the method of any one of Examples 12-15, further comprising transmitting by the transceiver, to the service scheduling server, pre-set data including user parameters related to price, requested service-type, membership information, distance willing to travel, priority fees, and time available for service.

Example 17 is the method of any one of Examples 12-15, further comprising receiving by the transceiver, updated data related to the assigned service slot from the service provider.

Example 18 is a system in a semi-autonomous or autonomous driving (SA/AD) vehicle to assist scheduling and arrival of the SA/AD vehicle at a service provider, comprising: driving elements; an onboard computer to receive an indication of a need for a service and in response, transmit a request message to a service scheduling server remote to the SA/AD vehicle to request a service slot at the service provider to be assigned for the SA/AD vehicle to receive the service, and receive, in response to the request message, an assignment message assigning the service slot to the SA/AD vehicle; and an output interface of the onboard computer, coupled to send signals to the driving elements to autonomously or semi-autonomously drive the SA/AD vehicle to the service provider to receive the service at the assigned service slot.

Example 19 is the system of Example 18, wherein the onboard computer includes a transceiver to transmit the request message, wherein the request message includes information related to a service type, urgency of the service, and location and destination of the SA/AD vehicle.

Example 20 is the system of Example 19, wherein the transceiver further to receive the assignment message, wherein the assignment message includes an identity of the service provider, the service provider selected based on pre-set data provided by the SA/AD vehicle and availability of service data provided by a plurality of service providers.

Example 21 is the system of Example 18, further comprising a service module coupled to the onboard computer, wherein based on a location and destination of the SA/AD vehicle, the service module to determine whether the SA/AD vehicle is in need of gasoline or electric charge.

Example 22 is the system of any one of Examples 18-21, wherein the driving elements are coupled to one or more of a vision camera, radar, or light ranging and detection (LIDAR) sensors to assist the driving elements in navigating to the service provider.

Example 23 is the system of any one of Examples 18-21, wherein the assigned service slot is a physical slot, a time slot, or both.

Example 24 is the system of any one of Examples 18-21, wherein the assigned service slot is a physical slot and the output interface of the onboard computer is coupled to send signals to the driving elements to guide the SA/AD vehicle into the assigned service slot.

Example 25 is a scheduling server to assist in assignment of a service provider for provision of a service to a semi-autonomous or autonomous driving (SA/AD) vehicle, comprising: one or more computer processors; a data acquisition module to operate on the one or more computer processors to: acquire from the SA/AD vehicle, a request for assignment of the service provider for provision of the service and including first data related to the request; acquire, from a plurality of service providers, second data related to availability of the service; acquire from a plurality of additional SA/AD vehicles, a plurality of additional requests for assignment to service providers and including third data related to the requests; and a prioritization module to operate on the one or more computing processors to: receive the first, second, and third data from the data acquisition module; and analyze the first, second, and third data to determine the service provider to assign to the SA/AD vehicle to the service provider.

Example 26 is the scheduling server of Example 25, wherein the first data related to the request comprises at least one of a status of need for the service, a location, and a destination of the SA/AD vehicle.

Example 27 is the scheduling server of Example 25, wherein the second data related to availability of the service comprises at least one of fuel or charge price, type of fuel or charge provided, open slots, location, and a current queue length at each of the plurality of service providers.

Example 28 is the scheduling server of Example 27, wherein the second data related to availability of the service comprises updated data related to an actual time of service.

Example 29 is the scheduling server of Example 25, wherein the data acquisition module to retrieve pre-set data related to the SA/AD vehicle and the prioritization module to analyze the pre-set data in conjunction with the first, second, and third data to determine the service provider to be assigned to the SA/AD vehicle.

Example 30 is the scheduling server of Example 29, wherein the pre-set data comprises user preference data to include at least one of information related to price, type of fuel or charge associated with the service, membership information, distance willing to travel, priority fees, and time available for service.

Example 31 is the scheduling server of any one of Examples 25-29, further comprising a communications module to operate on the one or more processors, to receive the request and the plurality of additional requests and after the service provider is determined, to direct the SA/AD vehicle to communicate directly with the assigned service provider.

Example 32 is the scheduling server of any one of Examples 25-29, wherein the data acquisition module to acquire the second data related to availability of the service from a gas or electricity charging provider and wherein the request includes a current level of fuel or charge remaining in the autonomous vehicle.

Example 33 is a computer-implemented method at a service provider to facilitate a service of an SA/AD vehicle assigned to the service provider, comprising: receiving, by a computer system, a request for the service from a remote scheduling servicer for a service slot for the assigned SA/AD vehicle to receive the service; acquiring, by the computer system, information about the service requested by the assigned SA/AD vehicle; setting, by the computer system, a reservation for the service at the service provider, based on availability of the service at the service provider; and communicating, by the computer system, to the assigned SA/AD vehicle, a confirmation of the reservation for the service.

Example 34 is the computer-implemented method of Example 33, comprising: collecting, by the computer system, feedback about provision of the service after the service is performed; and transmitting, by the computer system, the collected feedback to the remote scheduling server to assist in assignment of additional SA/AD vehicles to the service provider.

Example 35 is the computer-implemented method of Example 34, further comprising transmitting, by the computer system, updated information about a fuel or charge price or type of fuel or charge provided to the remote scheduling server to assist in assignment of additional SA/AD vehicles to the service provider.

Example 36 is the computer-implemented method of Example 33, wherein setting, by the computer system, the reservation comprises assigning a slot for a fuel or charge pump to the assigned SA/AD vehicle.

Example 37 is the computer-implemented method of Example 33, further comprising resetting, by the computer system, the reservation for the service at the service provider based on availability of the service at the service provider and communicating the resetting of the reservation to the assigned SA/AD vehicle.

Example 38 is the computer-implemented method of Example 37, wherein the resetting of the reservation for the service at the service provider to be based on updated information related to at least one of emergency vehicle priority, no-shows, and early or late arrivals of other assigned vehicles.

Example 39 is the computer-implemented method of any one of Examples 33-38, further comprising monitoring, by the computer system, the availability of the service by identifying a queue length, open slots, and a number of personnel at the service provider.

Example 40 is one or more computer-readable media containing instructions written thereon to cause a scheduling server, in response to execution of the instructions, to: receive a request from an SA/AD vehicle for assignment to a service provider for provision of a service, wherein the request includes first data related to an urgency for provision of the service and a location of the SA/AD vehicle; analyze the first data in conjunction with second data to determine a service provider to assign to the SA/AD vehicle, wherein the second data includes information received from a plurality of service providers related to availability of the service; and based on the analysis, direct the SA/AD vehicle to the assigned service provider for the service.

Example 41 is the computer-readable media of Example 40, wherein in response to execution of the instructions, further cause the scheduling server to receive additional requests from a plurality of additional SA/AD vehicles for assignment to a respective service provider and information related to the additional requests, to be analyzed in conjunction with the first and the second data to determine the assigned service provider.

Example 42 is the computer-readable media of Example 40, wherein the second data comprises an urgency for provision of the service and a location of each of the plurality of additional autonomous vehicles.

Example 43 is the computer-readable media of Example 40, wherein the second data related to availability of the service includes at least one of information related to price, time-to-service, and queue length at each of a plurality of gas or charging providers.

Example 44 is the computer-readable media of any one of Examples 40-43, wherein in response to execution of the instructions, further cause the scheduling server to receive updated second data from the plurality of service providers related to availability of the service.

Example 45 is the computer-readable media of one of Examples 40-43, wherein in response to execution of the instructions, cause the scheduling server to receive user preference information associated with the SA/AD vehicle and to analyze the user preference information in conjunction with the first and the second data to determine the service provider.

Example 46 is the computer-readable media of one of Examples 40-43, wherein in response to execution of the instructions, further cause the scheduling server to direct the autonomous vehicle to communicate directly with the determined service provider.

Example 47 is the computer-readable media of one of Examples 40-43, wherein in response to execution of the instructions, further cause the scheduling server to receive post-service data from the SA/AD vehicle and the determined service provider.

Example 48 is the computer-readable media of Example 47, wherein the post-service data to be used in the analysis to determine future service provider assignments.

Example 49 is one or more computer-readable media containing instructions written thereon to cause a computer-aided or autonomous driving (CA/AD) system, in response to execution of the instructions, to: transmit by a transceiver, a request message to a service scheduling server remote to the CA/AD system to request a service slot at a service provider to be assigned for a semi-autonomous or autonomous driving (SA/AD) vehicle to receive a service; receive by the transceiver, in response to the request message, an assignment message assigning the service slot to the SA/AD vehicle; and control by the CA/AD system, a vehicle control system to drive elements of the SA/AD vehicle to drive the SA/AD vehicle to the service provider to receive the service at the assigned service slot.

Example 50 is the computer-readable media of Example 49, wherein the instructions to cause the CA/AD system to transmit the request message includes instructions to transmit information related to at least one of a location of the SA/AD vehicle, a destination of the SA/AD vehicle, and a level of fuel or charge remaining in the SA/AD vehicle.

Example 51 is the computer-readable media of Example 49, wherein the instructions further comprise instructions to determine by a service module coupled to the driving elements, when the SA/AD vehicle is in need of the service.

Example 52 is the computer-readable media of Example 49, wherein the instructions to cause the CA/AD system to determine a need of the service includes instructions to determine a need for at least one of an oil change, battery change, tune up, or other maintenance or repair service for the SA/AD vehicle.

Example 53 is the computer-readable media of any one of Examples 49-52, wherein the instructions to cause the CA/AD system to transmit the request message to the scheduling server includes instructions to transmit pre-set data including user parameters related to price, requested service-type, membership information, distance willing to travel, priority fees, and time available for service.

Example 54 is the computer-readable media of any one any one of Examples 49-52, further comprising instructions to receive by the transceiver, updated data related to the assigned service slot from the service provider.

Example 55 is a system, comprising: means to receive a plurality of requests for services from a plurality of SA/AD vehicles requesting services from one or more service providers; means to prioritize each of the plurality of requests for services; and means to notify each of the plurality of SA/AD vehicles of a result of the prioritization.

Example 56 is the system of Example 55, wherein the means to receive the plurality of requests further comprise means to receive a plurality of status updates from the one or more service providers.

Example 57 is the system of Example 56, wherein the means to prioritize each of the plurality of requests includes means to prioritize the plurality of requests in conjunction with the plurality of status updates from the one or more service providers.

Although certain embodiments have been illustrated and described herein for purposes of description, this application is intended to cover any adaptations or variations of the embodiments discussed herein. Therefore, it is manifestly intended that embodiments described herein be limited only by the claims. Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A computer-aided or autonomous driving (CA/AD) system, comprising:
   at least one memory; and
   at least one processor;
   wherein the at least one memory and the at least one processor are disposed in a semi-autonomous or autonomous driving (SA/AD) vehicle, and coupled to perform operations including to cause the CA/AD system to:
   transmit to a service scheduling server remote to the CA/AD system, a request for a service slot to service the SA/AD vehicle at a service provider, wherein the request includes information about the service needed, wherein the service provider and the service slot are to be selected by the service scheduling server, and assigned to the SA/AD vehicle from a plurality of service providers having a plurality of service slots;
   receive, in response to the request, from the service scheduling server, an assignment message assigning the service provider and the service slot to the SA/AD vehicle;
   establish, in response to receipt of the service provider and service slot assignment, direct communication with the assigned service provider, including provision of estimated time of arrival for the service while en-route to the service provider for the service;
   receive from the assigned service provider, an updated service time for the service slot, wherein the updated service time is determined based at least in part on the SA/AD vehicle's estimated time of arrival for the service, and on the assigned service provider's real time statuses of performance of services on other vehicles; and
   autonomously or semi-autonomously drive the SA/AD vehicle to the service provider to receive the service in view of the updated service time.

2. The CA/AD system of claim 1, wherein the operations include to determine when the SA/AD vehicle is in need of the service, and to indicate to a communications module when to send the request.

3. The CA/AD system of claim 2, wherein the request is to include information about at least one of a type of service, level of service need, and a location and destination of the SA/AD vehicle.

4. The CA/AD system of claim 1, wherein the assignment message is to include an identity of a service provider selected based on at least one of fuel or charge price, type of fuel or charge provided, open slots, location, and a current queue length at each of the plurality of service providers.

5. The CA/AD system of claim 1, wherein the operations include to transmit to the service scheduling server, user preference data to include at least one of information related to price, type of fuel or charge associated with the service, membership information, distance willing to travel, priority fees, and time available for service.

6. The CA/AD system of claim 1, wherein the operations include to collect information about performance of the service and transmit the information to the service scheduling server.

7. The CA/AD system of claim 1, further comprising the driving elements coupled to the at least one processor and the at least one memory, and wherein the driving elements include one or more of an engine, electric motor, braking system, drive system, wheels, transmission, and a battery.

8. The CA/AD system of claim 1, wherein the CA/AD system comprises the SA/AD vehicle and further comprises sensors to receive sensor data indicative of a service need for the SA/AD vehicle.

9. The CA/AD system of claim 1, wherein the CA/AD system comprises the SA/AD vehicle.

10. The CA/AD system of claim 9, further comprising at least one of a vision-based camera, radar, and light detection and ranging (LIDAR) sensor to assist in guiding the SA/AD vehicle to the assigned service provider.

11. A method performed by a CA/AD system, comprising:
transmitting by a transceiver, a request message to a service scheduling server remote to a semi-autonomous or autonomous driving (SA/AD) vehicle to request a service slot to service the SA/AD vehicle at a service provider wherein the request includes information about the service needed, wherein the service provider and the service slot are to be selected by the service scheduling server, and assigned to the SA/AD vehicle from a plurality of service providers having a plurality of service slots;
receiving by the transceiver, in response to the request message, from the service scheduling server, an assignment message assigning the service provider and the service slot to the SA/AD vehicle;
establishing, in response to receipt of the service provider and service slot assignment, direct communication with the assigned service provider, including provision of estimated time of arrival for the service while en-route to the service provider for the service;
receiving from the assigned service provider, an updated service time for the service slot, wherein the updated service time is determined based at least in part on the SA/AD vehicle's estimated time of arrival for the service, and on the assigned service provider's real time statuses of performance of services on other vehicles; and
controlling, by a vehicle control system, driving elements of the SA/AD vehicle to autonomously or semi-autonomously drive the SA/AD vehicle to the service provider to receive the service in view of the updated service time.

12. The method of claim 11, wherein transmitting the request message by the transceiver includes transmitting information related to at least one of a location of the SA/AD vehicle, a destination of the SA/AD vehicle, and a level of fuel or charge remaining in the SA/AD vehicle.

13. The method of claim 11, further comprising determining by a service module coupled to the CA/AD system, a need for a service including at least one of an oil change, battery change, tune up, or other maintenance or repair service for the SA/AD vehicle.

14. The method of claim 11, further comprising transmitting by the transceiver, to the service scheduling server, pre-set data including user parameters related to price, requested service-type, membership information, distance willing to travel, priority fees, and time available for service.

15. One or more computer-readable media containing instructions written thereon to cause a computer-aided or autonomous driving (CA/AD) system of a semi-autonomous or autonomous driving (SA/AD) vehicle, in response to execution of the instructions, to:
transmit by a transceiver, a request message to a service scheduling server remote to the CA/AD system to request a service slot to service the SA/AD vehicle at a service provider, wherein the request includes information about the service needed, wherein the service provider and the service slot are to be selected by the service scheduling server, and assigned to the SA/AD from a plurality of service providers having a plurality of service slots;
receive by the transceiver, in response to the request message, an assignment message assigning the service provider including the service slot to the SA/AD vehicle;
establish, in response to receipt of the service provider and service slot assignment, direct communication with the assigned service provider, including provision of estimated time of arrival for the service while en-route to the service provider for the service;
receive from the assigned service provider, an updated service time for the service slot, wherein the updated service time is determined based at least in part on the SA/AD vehicle's estimated time of arrival for the service, and on the assigned service provider's real time statuses of performance of services on other vehicles; and
control by the CA/AD system, a vehicle control system to drive elements of the SA/AD vehicle to the service provider to receive the service in view of the updated service time.

16. The computer-readable media of claim 15, wherein the instructions to cause the CA/AD system to transmit the request message includes instructions to transmit information related to at least one of a location of the SA/AD vehicle, a destination of the SA/AD vehicle, and a level of fuel or charge remaining in the SA/AD vehicle.

17. The computer-readable media of claim 15, wherein the instructions to cause the CA/AD system to transmit the request message to the scheduling server include instructions to transmit pre-set data including user parameters related to price, requested service-type, membership information, distance willing to travel, priority fees, and time available for service.

18. The computer-readable media of claim 15, wherein the instructions further comprise instructions to determine by a service module coupled to the driving elements, when the SA/AD vehicle is in need of the service.

* * * * *